Dec. 31, 1929. P. BOREL 1,741,676
SEMIAUTOMATIC MAP POINTER FOR ROAD VEHICLES
Filed Nov. 5, 1926
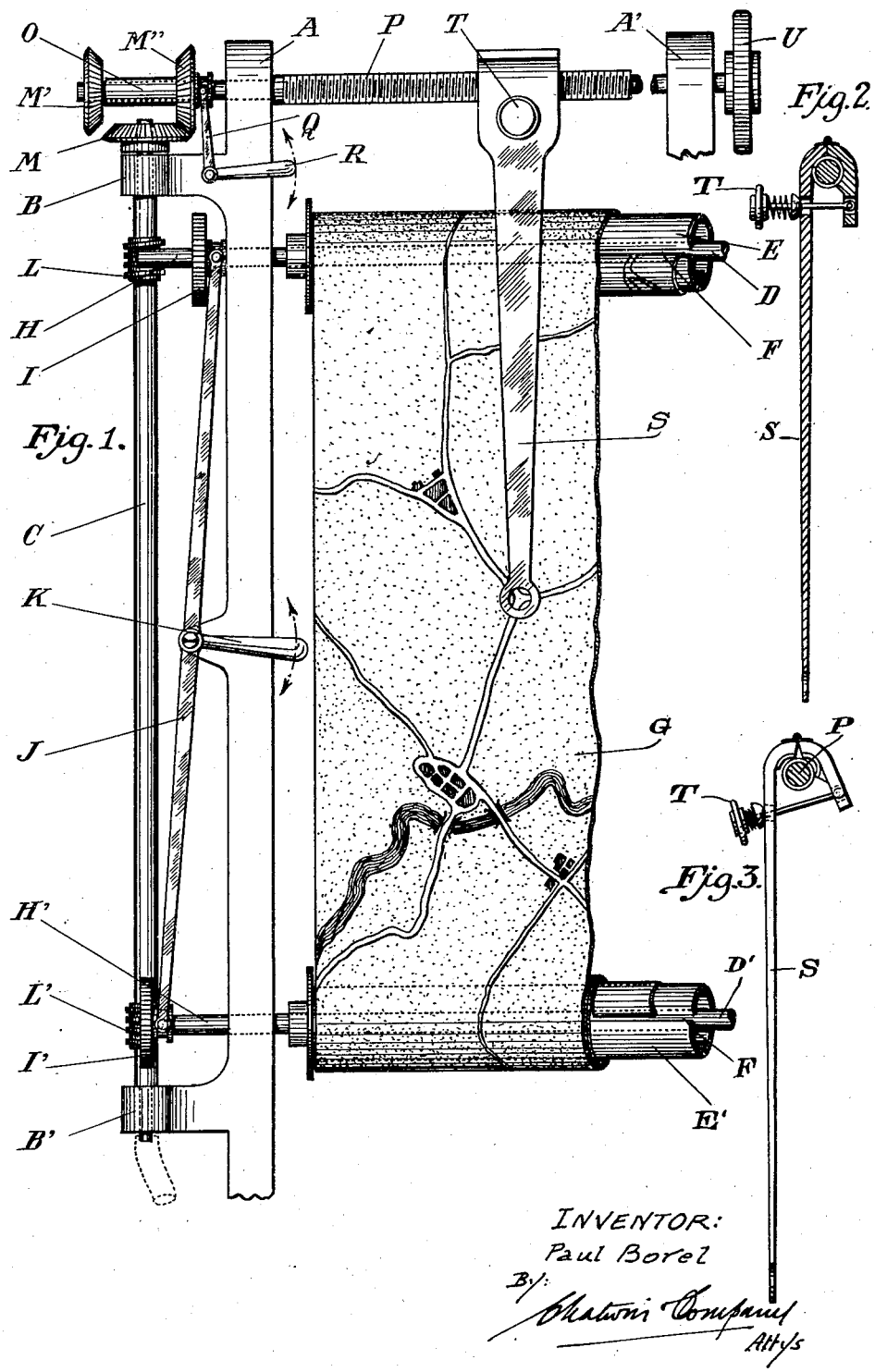
INVENTOR:
Paul Borel
By
Chatwin Company
Attys Patented Dec. 31, 1929

1,741,676

UNITED STATES PATENT OFFICE

PAUL BOREL, OF MARSEILLE, FRANCE

SEMIAUTOMATIC MAP POINTER FOR ROAD VEHICLES

Application filed November 5, 1926, Serial No. 146,505, and in France December 12, 1925.

The invention consists in a semi-automatic unrolling device for road-maps, enabling the driver to conveniently and constantly follow the road covered by his or her vehicle.

The annexed drawing shows a preferred embodiment of the invention, in which,

Figure 1 is a front view of the device carrying a road-map, with parts of both the map and the apparatus cut away.

Fig. 2 is a sectional view of the pointer closed on the threaded shaft.

Fig. 3 is a side elevation of the pointer open and disengaged from the threaded shaft.

The unrolling device for road-maps is made up of a metal or other standard A, which can be fitted up in any part of the vehicle, but, for preference, under the driver's eyes. On this standard are provided bearing brackets B and B' in which are fitted the vertical shaft C and the two horizontal ones D and D', the latter being also supported, at their other end, by another standard A', only partly shown on the drawing.

These D and D' shafts carry driving rollers E, E' having a slot F, F' in which are fitted the parallel edges of the road-map as shown in G, the purpose of this device being to fix the map on the driving rollers E and E'.

The D and D' shafts have also an extension H and H' on which are slidably movable, but not rotatable the gear-wheels I, I' actuated by the movable arm J by means of the handle K.

The gear-wheels I, I' come in turn, according to the direction the vehicle travels in, in mesh with the worm-gears L, L', fixed on the driving axle C, which is actuated by any known device, calculated according to the scale of the map and driven by the wheels of the vehicles.

The upper end of the shaft C carries the cone-gear wheel corresponding to the gear-wheels M' M'', both fitted on a sleeve O, sliding freely on one end of the threaded shaft P and moved by the small arm Q, under the action of the handle R. The shaft P, drives the pointer S sideways in either direction.

A finger or pointer S is hinged at its topmost part, which allows of its being speedily placed at any point of the screwed axle P. The nut thus formed by the hinged parts is opened by simple pressure on the button T actuating a recalling spring; the tension of the latter is such as to prevent any move of the pointer, which might be due to the jolts or vibrations of the vehicle. A small wheel U is fixed on to the other end of the threaded axle P, with a view to actuating the latter by hand and, at the same time, shipping the pointer S.

With this purpose in mind, the motion of the cone-gears M' M'' and the gear-wheels I, I'' is calculated so as to leave momentarily free the two axles P and C.

All the parts making up the device are enclosed in a glass-case, so that the motion of the pointer over the map may be watched and followed.

The apparatus works as follows:

One of the edges of the road-map is pushed into the slot F of the roller E, for instance, and is then rolled up around the latter until its lower edge can, in turn, be pushed into the slot F' of the roller E'.

Thus fixed into position, it is an easy matter for the driver, by moving the levers K and R, to produce, according to the direction of the road as shown on the road-map, the unrolling of the latter at a speed in ratio to that of the vehicle in order to enable him by means of the fixed or moving pointer S, an easy, speedy, and relatively accurate reading of the road to be followed.

I declare that what I claim is:—

In a semi-automatic map-pointer for road vehicles, the combination of two parallel rollers, means for fixing one end of a map to one of said rollers, and the other end of said map to the other roller, a driving shaft perpendicular to said rollers and means for coupling the rollers to the driving shaft, a first handle for actuating said coupling means in such a manner that either the one or the other roller is actuated, means for rotating the driving shaft calculated according to the scale of the map and driven by the wheels of the vehicle, a screw threaded axle parallel to the rollers, means for coupling said screw threaded axle to the driving shaft, a cone gear on the end of the driving shaft and a reverse gear slidable on the screw threaded axle so arranged as to be brought into engagement with said cone gear, a second handle for actuating said reverse gear, so as to either stop the motion of the axle or to rotate it in the one or the other direction, means for actuating said axle by hand, a map-pointer mounted on the screw threaded axle and driven by the latter, means for releasing the map-pointer from the axle allowing its being placed at any point of the axle, and a frame bearing the driving shaft, said rollers, the screw threaded axle and both handles.

In testimony whereof I have affixed my signature.

PAUL BOREL.